(12) United States Patent
Tang et al.

(10) Patent No.: US 7,672,080 B1
(45) Date of Patent: Mar. 2, 2010

(54) LAMINATED PERPENDICULAR WRITER HEAD INCLUDING AMORPHOUS METAL

(75) Inventors: YunJun Tang, Pleasanton, CA (US); Kyusik Sin, Pleasanton, CA (US); Yingjian Chen, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 635 days.

(21) Appl. No.: 11/521,949

(22) Filed: Sep. 15, 2006

(51) Int. Cl.
*G11B 5/147* (2006.01)

(52) U.S. Cl. .............................. 360/125.12; 360/125.03

(58) Field of Classification Search ............ 360/125.12, 360/125.03
See application file for complete search history.

(56) References Cited

U.S. PATENT DOCUMENTS

| | | | |
|---|---|---|---|
| 4,535,375 A * | 8/1985 | Mowry et al. .......... 360/327.11 |
| 6,771,464 B2 | 8/2004 | Minor | |
| 6,791,796 B2 | 9/2004 | Shukh et al. | |
| 2002/0048693 A1* | 4/2002 | Tanahashi et al. ...... 428/694 TS |
| 2003/0197976 A1* | 10/2003 | Van der Heijden et al. .. 360/125 |
| 2004/0004786 A1* | 1/2004 | Shukh et al. ................. 360/126 |
| 2004/0066574 A1* | 4/2004 | Crue et al. .................... 360/125 |
| 2004/0120074 A1* | 6/2004 | Okada et al. ................. 360/126 |
| 2004/0184191 A1* | 9/2004 | Ichihara et al. ............. 360/126 |
| 2004/0228031 A1* | 11/2004 | Takeo .......................... 360/125 |
| 2004/0257702 A1* | 12/2004 | Kimura et al. ............... 360/126 |
| 2005/0013044 A1 | 1/2005 | Hirata et al. | |

OTHER PUBLICATIONS

Yasuyuki Okada, et al., "Magnetic Properties of FeCo Multilayered Films for Single Pole Heads", IEEE Transactions on Magnetics, vol. 40, No. 4, Jul. 2004, pp. 2368-2370.

* cited by examiner

*Primary Examiner*—Jefferson Evans
(74) *Attorney, Agent, or Firm*—Virtual Law Partners, LLP

(57) ABSTRACT

A writer pole for perpendicular recording and a method of manufacturing the same are provided. The writer pole comprises a laminated structure of a first magnetic layer, a second magnetic layer, and a non-magnetic amorphous metal spacer layer disposed between the first and second magnetic layers. Additional ferromagnetic and non-magnetic layers can be added, in an alternating fashion, to produce other laminated structures. Forming a perpendicular writer element includes forming a first magnetic layer, forming a spacer layer on the first magnetic layer, and forming a second magnetic layer on the spacer layer. Forming the perpendicular writer element can further include trimming the writer pole.

20 Claims, 3 Drawing Sheets

LAMINATED PERPENDICULAR WRITER HEAD INCLUDING AMORPHOUS METAL

BACKGROUND OF THE INVENTION

1. Field of the Invention

The present invention relates generally to the field of magnetic recording and more particularly to magnetic heads for perpendicular recording.

2. Description of the Prior Art

Perpendicular magnetic recording is a recording technique in which magnetic data bits on a magnetic recording disk are defined such that their magnetic moments are perpendicular to the plane of the magnetic recording disk, as opposed to in the plane of the disk as occurs with longitudinal magnetic recording. The progress to perpendicular recording from longitudinal recording is seen as one of the advances that will allow the continued increase in data densities on magnetic recording disks in the coming years.

SUMMARY

A writer pole for perpendicular recording, according to an exemplary embodiment of the present invention, comprises a first magnetic layer, a second magnetic layer, and a spacer layer disposed between the first and second magnetic layers and comprising a non-magnetic amorphous metal. Additional ferromagnetic and non-magnetic layers can be added, in an alternating fashion, to produce other laminated structures of the present invention.

An exemplary method of manufacturing a perpendicular recording head, according to an embodiment of the present invention, comprises forming a reader element and forming a perpendicular writer element. Forming the perpendicular writer element includes forming a first magnetic layer, forming a spacer layer on the first magnetic layer, and forming a second magnetic layer on the spacer layer. The spacer layer comprises a non-magnetic amorphous metal. Forming the perpendicular writer element can further include trimming the writer pole.

DETAILED DESCRIPTION OF THE INVENTION

Figure 1:
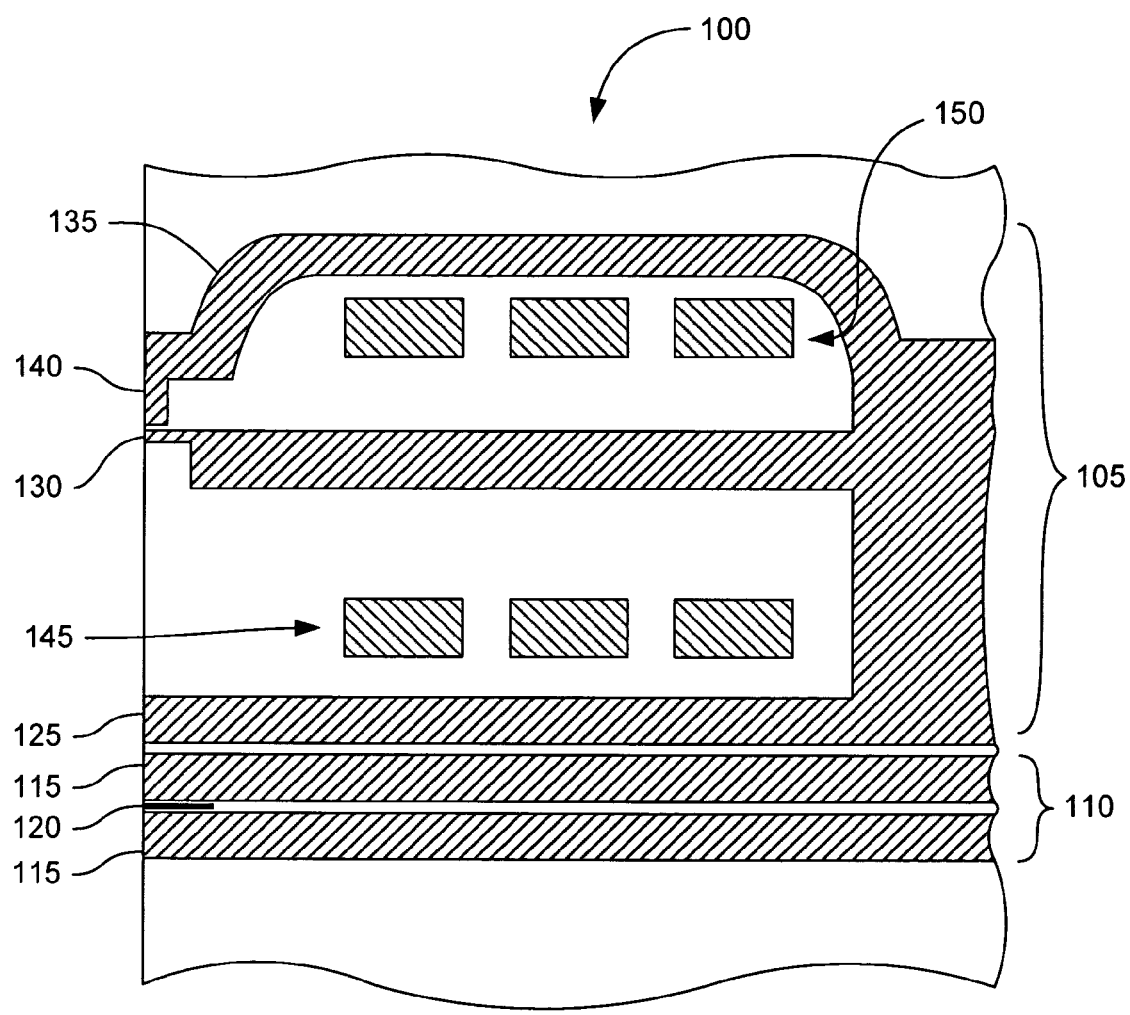
FIG. 1 is a cross-sectional view of a transducer of a perpendicular recording head according to an exemplary embodiment of the present invention.

The present invention provides writer poles for perpendicular recording heads. FIG. 1 shows a cross-sectional view of a transducer 100 of a perpendicular recording head according to an exemplary embodiment. The transducer 100 comprises a perpendicular recording writer element 105 and a reader element 110. The reader element 110 includes two shields 115 and a magnetoresistive (MR) stripe 120, that can be, for example, a giant magnetoresistive (GMR) or tunneling magnetoresistive (TMR) stripe.

The perpendicular recording writer element 105 includes a bottom pole 125, a writer pole 130, a top shield 135, and a shield pedestal 140. The bottom and writer poles 125 and 130 are joined together to form a first yoke. The first yoke includes coil windings 145 disposed between the bottom and writer poles 125 and 130. In the first yoke, magnetic flux from the head 100 circulates between writer pole 130 and the bottom pole 125. For example, flux from the writer pole 130 may exit the writer pole 130, return through the bottom pole 125, and circulate back through the first yoke. The writer pole 130, top shield 135, and shield pedestal 140 are also joined together to form a second yoke, and the second yoke also includes coil windings 150 disposed between the writer pole 130 and the top shield 135. Additionally, the second yoke further includes a gap layer 155 disposed between the writer pole 130 and the top shield pedestal 140. In the second yoke, magnetic flux from the head 100 circulates between writer pole 130 and the top shield pedestal 140/top shield 135. For example, flux from the writer pole 130 may exit the writer pole 130, return through the top shield pedestal 140 and top shield 135, and circulate back through the second yoke. Also shown in FIG. 1 are a number of encapsulating layers 157, formed typically of a dielectric material such as alumina ($Al_2O_3$).

Figure 2:
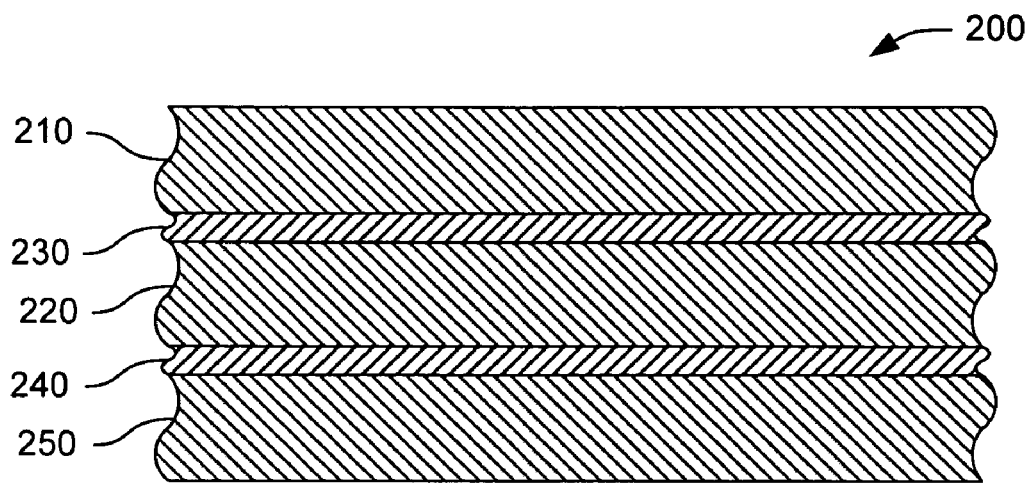
FIG. 2 is a cross-sectional view of a writer pole of a transducer according to an exemplary embodiment of the present invention.

FIG. 2 shows a cross-sectional view of an exemplary writer pole 200 of a transducer of a recording head, such as transducer 100. As shown in FIG. 2, the writer poles of the present invention are laminated structures that alternate ferromagnetic and non-magnetic layers. These structures exhibit strong magnetostatic coupling between adjacent magnetic layers as well as extremely low magnetic remanence, Br, and coercivity, Hc. These properties advantageously reduce the remanent field of the writer pole to alleviate the problems of pole erasure and domain lock-up so that recorded data is not unintentionally erased during non-write operations.

In one embodiment, writer pole 200 comprises a first magnetic layer 210, a second magnetic layer 220, and a non-magnetic spacer layer 230 disposed therebetween. Together, the first and second magnetic layers 210, 220 and the spacer layer 230 comprise a unit to which additional magnetic layers and spacer layers can be added in an alternating fashion. In the particular embodiment shown in FIG. 2, a second spacer layer 240 and a third magnetic layer 250 have been added.

It will be appreciated that many other permutations are possible. For example, in FIG. 2, either or both ends of the writer pole 200 can be capped by an additional spacer layer that is termed a capping layer. Additional repeating units comprising a spacer layer and a magnetic layer can be added. As another example, a writer pole with 5 repeating units where each repeating unit includes a 2 nm thick spacer layer and a 50 nm thick magnetic layer would define a thickness of a pole tip the writer pole 200 of approximately 258 nm, not counting the thickness of the one spacer layer that serves as a capping layer.

In various embodiments of the invention, the magnetic layers can have the same or different compositions and thicknesses. In some embodiments, all of the magnetic layers have the same composition and thickness. Other embodiments alternate between two different magnetic layers, such that in FIG. 2 the first and third magnetic layers 210, 250 have one composition, while the second magnetic layer 220 has a second composition. Suitable compositions for the magnetic layers of the invention can include any ferromagnetic material. Particular examples comprise FeCo alloys such as FeCoN. An exemplary magnetic layer comprising sub-layers is described below with respect to FIG. 3.

In some embodiments that include more than one spacer layer, the multiple spacer layers have the same composition and thickness. In other embodiments, the compositions and thicknesses can vary, in a manner similar to that described above with respect to the magnetic layers of a writer pole of the invention.

Spacer layers of the invention comprise a non-magnetic amorphous metal of either a metallic element or alloy. Suitable non-magnetic metals include Pd, Pt, W, Al, Ni, Cu, Au, Ag, Ta, Ru, V, Zr, Cr, Zn, Ti, Nb, Mo, Hf, La, Mg, and Ga, and alloys thereof. Some alloys can include additions of non-metallic elements such as Si, P, and B. Particular examples include Ni—Nb and Zr—Cu alloys. Some elements, such as Pd, when formed in sufficiently thin layers, readily form amorphous films. Some elements, when included in an alloy, are known to promote the formation of amorphous films. Such elements include Si, P, B, Cu, and Zr.

Figure 3:
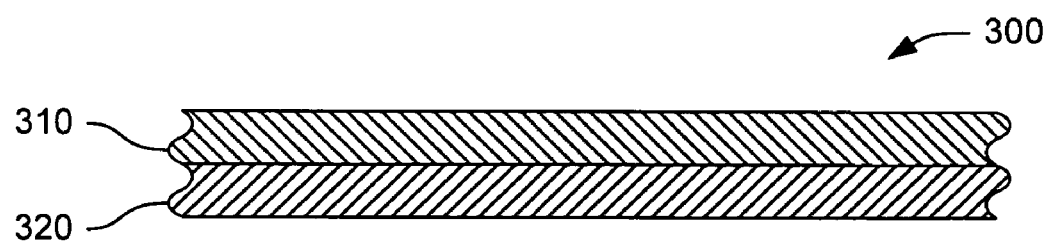
FIG. 3 is a cross-sectional view of a magnetic layer according to an exemplary embodiment of the present invention.

FIG. 3 shows a cross-sectional view of an exemplary magnetic layer 300 of the present invention comprising sub-layers 310 and 320. The sub-layers 310 and 320 can comprise, for example, a NiFe layer and a FeCo or FeCoN layer.

Figure 4:
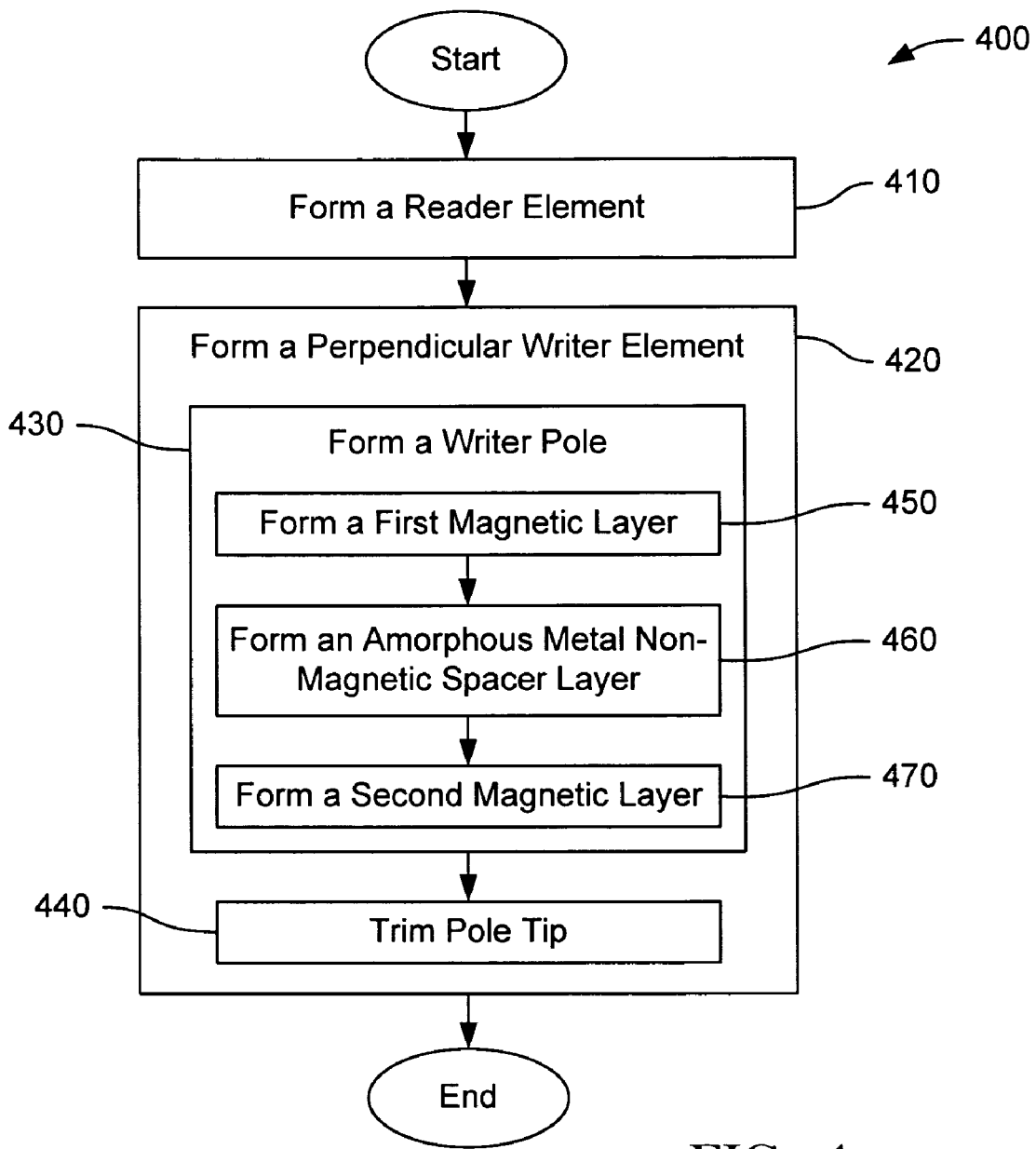
FIG. 4 is a flow chart representation of a method of manufacturing a perpendicular recording head according to an exemplary embodiment of the present invention.

FIG. 4 shows a flow chart representation of a method 400 of manufacturing a perpendicular recording head, according to an exemplary embodiment of the present invention. The method comprises forming 410 a reader element and forming 420 a perpendicular writer element. Forming 420 the perpendicular writer element can include forming 430 a writer pole and trimming 440 the writer pole.

Forming 430 the writer pole, in turn, comprises forming 450 a first magnetic layer, forming 460 forming a spacer layer, comprising a non-magnetic amorphous metal, on the first magnetic layer, and forming 470 a second magnetic layer on the spacer layer. Forming 450 the first magnetic layer can be achieved by any number of conventional deposition techniques such as sputtering, plating, chemical vapor deposition (CVD), ion beam deposition (IBD), and molecular beam deposition (MBE). Forming 450 the first magnetic layer can include depositing the first magnetic layer to a thickness in the range of about 2 nm to 200 nm. A more specific range for the thickness of the first magnetic layer is about 20 nm to 40 nm, and 30 nm is a suitable thickness in some embodiments.

Forming 460 the spacer layer can also be achieved by any number of conventional deposition techniques such as sputtering, plating, CVD, IBD, MBE. Forming 460 the spacer layer, in some embodiments, is performed using the same deposition technique as was used to form 450 the first magnetic layer. Advantageously, in some of these embodiments, the same deposition system, such as a sputtering system, can be used to form both the magnetic and spacer layers.

Forming 460 the spacer layer can include depositing the spacer layer to a thickness in the range of about 0.5 nm to 5.0 nm. A more specific range for the thickness of the spacer layer is about 0.5 nm to 3.0 nm, a still more specific range is about 1.0 nm to about 1.5 nm. It will be appreciated that in some embodiments the spacer layer comprises a monolayer.

Forming 470 the second magnetic layer can be achieved as described above with respect to forming 450 the first magnetic layer. The composition and thickness of the second magnetic layer is the same as the first magnetic layer, in some embodiments. One advantage of the laminated structures of the present invention, compared to structures that do not employ spacer layers, is that every magnetic layer formed on a spacer layer has a fine crystal structure that contributes to the advantageous properties described above. Without the spacer layers, crystals grow into uninterrupted columns. Frequent thin, smooth, and amorphous spacer layers between thin magnetic layers, therefore, prevent columnar growth to keep the grain size in the magnetic layers very small.

It will be appreciated that forming 450 the first magnetic layer and forming 470 the second magnetic layer can also include applying a biasing magnetic field during the deposition to align the magnetic moments of the magnetic layers. A suitable magnetic field strength for the biasing magnetic field is in the range of about 50 Oe to 100 Oe. In alternate embodiments, rather than apply a biasing magnetic filed during deposition, the completed writer pole can be subjected to an anneal at a temperature in the range of about 150° C.-300° C. for about 0.5 hour to about 20 hours in a biasing magnetic field with a magnetic field strength in the range of about 100 Oe to 10,000 Oe.

Trimming 440 the writer pole can be achieved by conventional pole trimming techniques such as ion beam etching (IBE). One further advantage of the amorphous metal spacer layers of the present invention is that the spacer layers etch at essentially the same rate as the magnetic layers. Accordingly, the resulting side-walls of the writer pole are smooth.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A writer pole for perpendicular recording, the writer pole comprising:
   a first magnetic layer;
   a second magnetic layer; and
   a spacer layer disposed between the first and second magnetic layers and comprising a non-magnetic amorphous metal.

2. The writer pole of claim 1 wherein the amorphous metal comprises a Ni—Nb alloy.

3. The writer pole of claim 1 wherein the amorphous metal comprises a Zr—Cu alloy.

4. The writer pole of claim 1 wherein the amorphous metal includes Cu.

5. The writer pole of claim 1 wherein the amorphous metal includes Zr.

6. The writer pole of claim 1 wherein the amorphous metal is an alloy including a metal selected from the group consisting of Pd, Pt, W, Al, Ni, Cu, Au, Ag, Ta, Ru, V, Zr, Cr, Zn, Ti, Nb, Mo, Hf, La, Mg, and Ga.

7. The writer pole of claim 1 wherein the first and second magnetic layers comprise the same composition.

8. The writer pole of claim 6 wherein the composition of the first and second magnetic layers comprises FeCo.

9. The writer pole of claim 6 wherein the composition of the first and second magnetic layers comprises FeCoN.

10. The writer pole of claim 1 wherein the first and second magnetic layers each comprise two sub-layers.

11. The writer pole of claim 10 wherein one of the two sub-layers of each of the first and second magnetic layers comprises NiFe.

12. The writer pole of claim 1 wherein a thickness of the spacer layer is in the range of about 0.5 nm-3.0 nm n.

13. The writer pole of claim 1 wherein a thickness of the spacer layer is in the range of about 1.0 nm-1.5 nm.

14. The writer pole of claim 1 wherein thicknesses of the first and second magnetic layers are in the range of about 20 nm-40 nm.

15. A method of manufacturing a perpendicular recording head, the method comprising:
    forming a reader element; and
    forming a perpendicular writer element including forming a writer pole by forming a first magnetic layer,
        forming a spacer layer, comprising a non-magnetic amorphous metal, on the first magnetic layer, and
        forming a second magnetic layer on the spacer layer.

16. The method of claim 15 wherein the forming the first and second magnetic layers and the spacer layer are performed in the same deposition system.

17. The method of claim 16 wherein the deposition system is a sputtering system.

18. The method of claim 15 wherein forming the first and second magnetic layers includes applying a biasing magnetic field.

19. The method of claim 15 further comprising annealing the writer pole in a biasing field after forming the second magnetic layer.

20. The method of claim 15 further comprising trimming the writer pole.

* * * * *